United States Patent
Li et al.

(10) Patent No.: US 7,688,690 B2
(45) Date of Patent: Mar. 30, 2010

(54) METHOD OF ACTIVATING A DATA PHASE LOCKED LOOP DURING TRACK-SEEKING AND APPARATUS OF OPERATING THE SAME

(75) Inventors: Sung-Hung Li, Taipei Hsien (TW); Te-Ju Wang, Tao-Yuan Hsien (TW)

(73) Assignee: Princeton Technology Corporation, Hsin Tien, Taipei County (TW)

( * ) Notice: Subject to any disclaimer, the term of this patent is extended or adjusted under 35 U.S.C. 154(b) by 994 days.

(21) Appl. No.: 11/308,266

(22) Filed: Mar. 14, 2006

(65) Prior Publication Data
US 2007/0091744 A1 Apr. 26, 2007

(30) Foreign Application Priority Data
Oct. 24, 2005 (TW) .............................. 94137140 A

(51) Int. Cl.
*G11B 7/00* (2006.01)
(52) U.S. Cl. .................. 369/44.28; 369/44.11
(58) Field of Classification Search .............. None
See application file for complete search history.

(56) References Cited

U.S. PATENT DOCUMENTS

| 6,363,042 B1 | 3/2002 | Sakashita | |
|---|---|---|---|
| 6,728,184 B2 * | 4/2004 | Chan | 369/53.28 |
| 7,193,941 B2 * | 3/2007 | Yamamoto et al. | 369/47.3 |
| 7,327,647 B2 * | 2/2008 | Liow et al. | 369/47.27 |
| 2003/0091350 A1 * | 5/2003 | Lai et al. | 398/153 |
| 2004/0213119 A1 * | 10/2004 | Van Vlerken et al. | 369/59.2 |
| 2005/0219971 A1 * | 10/2005 | Shih et al. | 369/44.28 |

FOREIGN PATENT DOCUMENTS

| JP | 2000-90590 | 3/2000 |
|---|---|---|
| JP | 2000-173195 | 6/2000 |
| TW | 436766 | 5/2001 |

* cited by examiner

*Primary Examiner*—Lixi Chow
(74) *Attorney, Agent, or Firm*—Winston Hsu

(57) ABSTRACT

A method of determining whether an optical pick-up of an optical device passes through a data track of a storage device during track-seeking based on a radio frequency (RF) signal, a radio frequency zero cross (RFZC) signal radio and a track-seeking signal of the optical device. When the optical pick-up of the optical device passes through a data track of the storage device during track-seeking, a trigger signal is sent to a data phase locked loop of the optical device for frequency and phase adjustment. The method can activate the data phase locked loop of the optical device while the optical device is performing track-seeking.

6 Claims, 4 Drawing Sheets

METHOD OF ACTIVATING A DATA PHASE LOCKED LOOP DURING TRACK-SEEKING AND APPARATUS OF OPERATING THE SAME

BACKGROUND OF THE INVENTION

1. Field of the Invention

The present invention relates to a method of activating a data phase locked loop and an apparatus of operating the same, and more particularly, to a method of activating a data phase locked loop during track-seeking and an apparatus of operating the same.

2. Description of the Prior Art

Small-sized, low-cost and large capacity compact discs capable of storing vast amounts of electronic information, data or video messages have become one of the most important means of storing data in modern society. Common digital optical storage devices include compact discs (CDs), video compact discs (VCDs), or digital versatile discs (DVDs) having various specifications such as DVD-R, DVD-RAM and DVD-RW. An optical device, such as a CD player, uses an optical pick-up to access data stored in a CD. To access the correct data, the optical device is required to seek a corresponding target data track and locate the optical pick-up on the target data track for reading or writing data. Therefore, the ability of performing efficient and accurate track-seeking greatly determines the performance of the optical device and has become a major focus when developing a new optical device.

Optical discs, such as CDs, DVDs and VCDs, include a plurality of continuous tracks for data storage. The continuous tracks, comprising many pits and lands, are formed spirally on the surface of the optical disc. Data is written into the optical disc based on a writing pulse and is embedded on the surface of the optical disc in the form of digital signals. Since a piece of data is usually stored closer to the center of the optical disc, the optical pick-up moves from inner data tracks towards outer data tracks when accessing data stored in the optical disc. However, in applications such as playing songs stored in a CD randomly instead of sequentially, the optical pick-up is often required to move from the current data track to another data track. This action of seeking a target data tack is referred to track-seeking or track-crossing. The optical pick-up does not access data while perform track-seeking. Data is only accessed after the optical pick-up has completed track-seeking and has found the target data track.

Since the inner and outer data tracks of the optical disc have different rotational speeds, the locking time of a data phase locked loop (data PLL) often affects the specification of data access time. The data PLL is an essential part of an optical device and can generate timing pulse signals, based on which the optical device can access data stored in the optical disc. Referring to FIG. 1, a prior art data PLL 10 is described. The data PLL 10 includes a phase detector 13, a frequency detector 14, a charge pump 15, a filter 16, a voltage-controlled oscillator (VCO) 17, and a frequency divider 19. The phase detector 13 and the frequency detector 14 provide the charge pump 15 with an adjusting signal based on phase and frequency differences between an eight-to-fourteen modulation signal EFM measured from the optical disc and a feedback signal EFMCLK. Then, the adjusting signal is processed by the charge pump 15, the filter 16, the VCO 17 and the frequency divider 19 for generating the feedback signal EFMCLK. Finally, the feedback signal EFMCLK is sent to the phase detector 13 and the frequency detector 14 and thereby forms a loop until the frequency and the phase of the feedback signal EFMCLK completely match those of the eight-to-fourteen modulation signal EFM.

Since the pick-up of the optical device is not required to access data during track-seeking, the data PLL 10 remains in a "hold" state, which will be explained later. After the optical device has completed performing track-seeking, the data PLL 10 begins frequency or phase adjustments so that the optical pick-up of the optical device can access data stored in the target data track. Referring to FIG. 2, the operation of the prior art data PLL 10 is described. In FIG. 2, T1-T5 represent data tracks of an optical disc, wherein T1 is a starting data track, T5 is a target data track, T2-T4 are data tracks passed by the optical pick-up when the optical device is performing track-seeking (moving from the data track T1 to the data track T5), RF represents a radio frequency signal of the optical device, TRON represents a track-seeking signal measured from the optical disc, and an arrow indicates the track-seeking direction of the optical device. The track-seeking signal TRON having a low potential indicates that the optical device is performing track-seeking and is not required to access data, while the track-seeking signal TRON having a high potential indicates that the optical device has finished performing track-seeking and is ready for data access. The prior art data PLL 10 determines whether it should perform frequency and phase adjustments based on the potentials of the track-seeking signal TRON: if the track-seeking signal TRON has a low potential, the data PLL 10 remains in the "hold" state in which the frequency and the phase of the signal remains the same as when it is used to access the data track T1 and no adjustment is performed; if the track-seeking signal TRON has a high potential, the data PLL 10 adjusts the frequency and the phase of the signal used to access the target data track T5.

The prior art data PLL 10 performs frequency and phase adjustments after the optical pick-up of the optical device has finished track-seeking and found the target track. The adjustments continue until the phase and the frequency of the feedback signal EFMCLK match those of the eight-to-fourteen modulation signal EFM of the optical disc, and data can then be accessed. Since the data tracks T1 and T5 have different rotational speed, the frequency ranges of signals measured from the data tracks T1 and T5 by the optical pick-up also vary. Therefore, in the prior art optical device, longer time is required for phase and frequency adjustments, resulting in longer data access time and influencing the performance of the optical device.

SUMMARY OF THE INVENTION

The claimed invention provides a method of activating a data phase locked loop during track-seeking comprising (a) determining whether a pick-up of an optical device is performing track-seeking on a storage medium; (b) determining whether the pick-up of the optical device is on a data track of the storage medium; and (c) adjusting a data phase locked loop of the optical device if the pick-up of the optical device is performing track-seeking on the storage medium and is on a data track of the storage medium.

The claimed invention also provides a data phase locked loop capable of being activated during track-seeking comprising: a phase detector for generating a phase-adjusting signal based on an input signal and a feedback signal of an optical device; a frequency detector for generating a frequency-adjusting signal based on the input signal of the optical device and the feedback signal; an adjusting circuit for generating the feedback signal based on the phase-adjusting signal and the frequency-adjusting signal; and a control circuit for generating and sending a trigger signal to the phase detector and the frequency detector for activating the phase detector and the frequency detector when a pick-up of the optical device is performing track-seeking on a storage medium and is on a data track of the storage medium.

These and other objectives of the present invention will no doubt become obvious to those of ordinary skill in the art after reading the following detailed description of the preferred embodiment that is illustrated in the various figures and drawings.

DETAILED DESCRIPTION

The present invention provides a method of activating a data phase locked loop (data PLL) during track-seeking. Based on a radio frequency (RF) signal, radio frequency zero cross signal (RFZC signal), and a track-seeking signal (TRON signal) measured by an optical device, it is determined whether a pick-up of the optical device passes through a data track of a storage medium during track-seeking. When the pick-up of the optical device passes through the data track of the storage medium during track-seeking, a trigger signal is sent to the data PLL of the optical device for performing phase and frequency adjustments.

Figure 1:
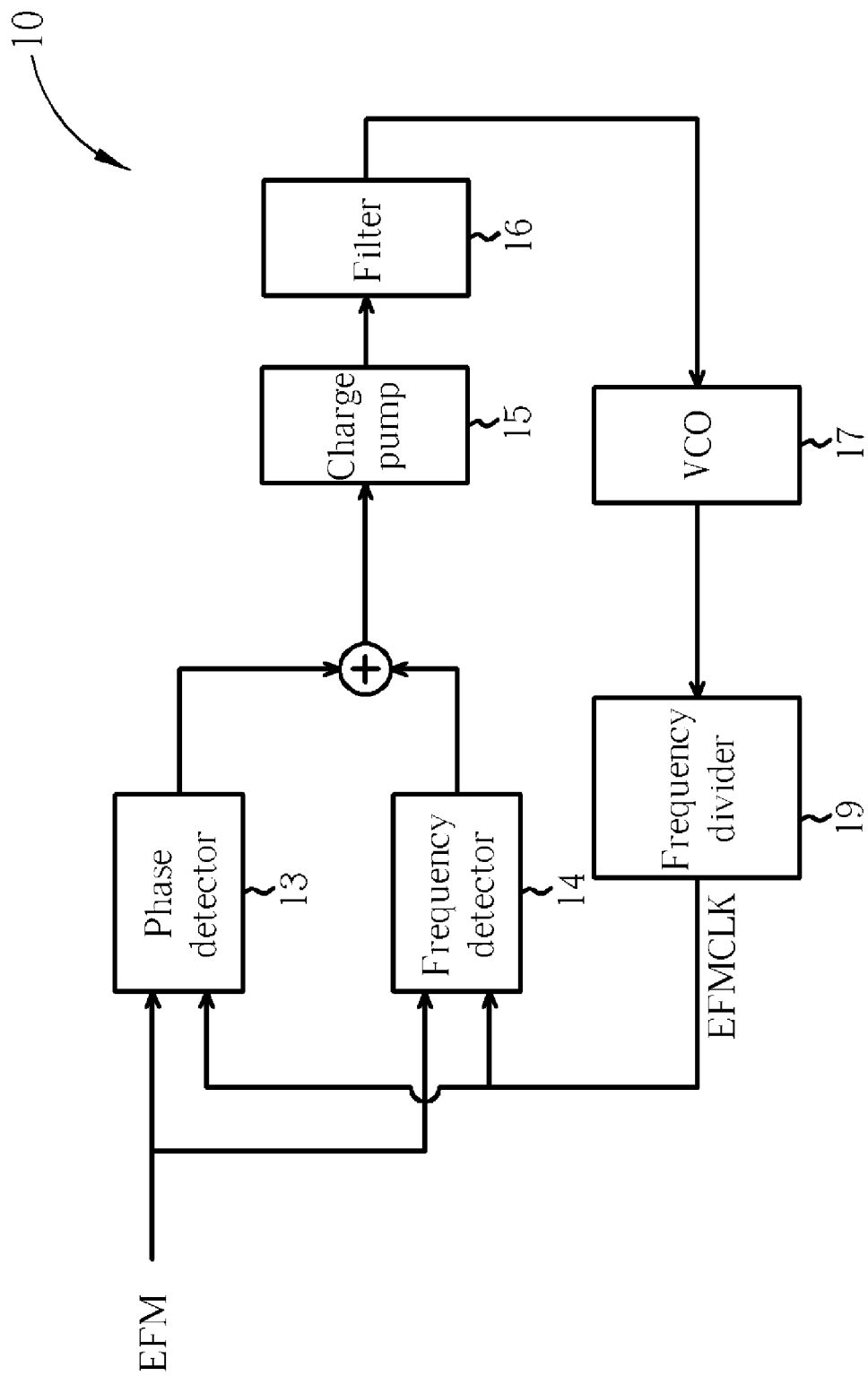
FIG. 1 is a diagram of a prior art data PLL.
Figure 2:
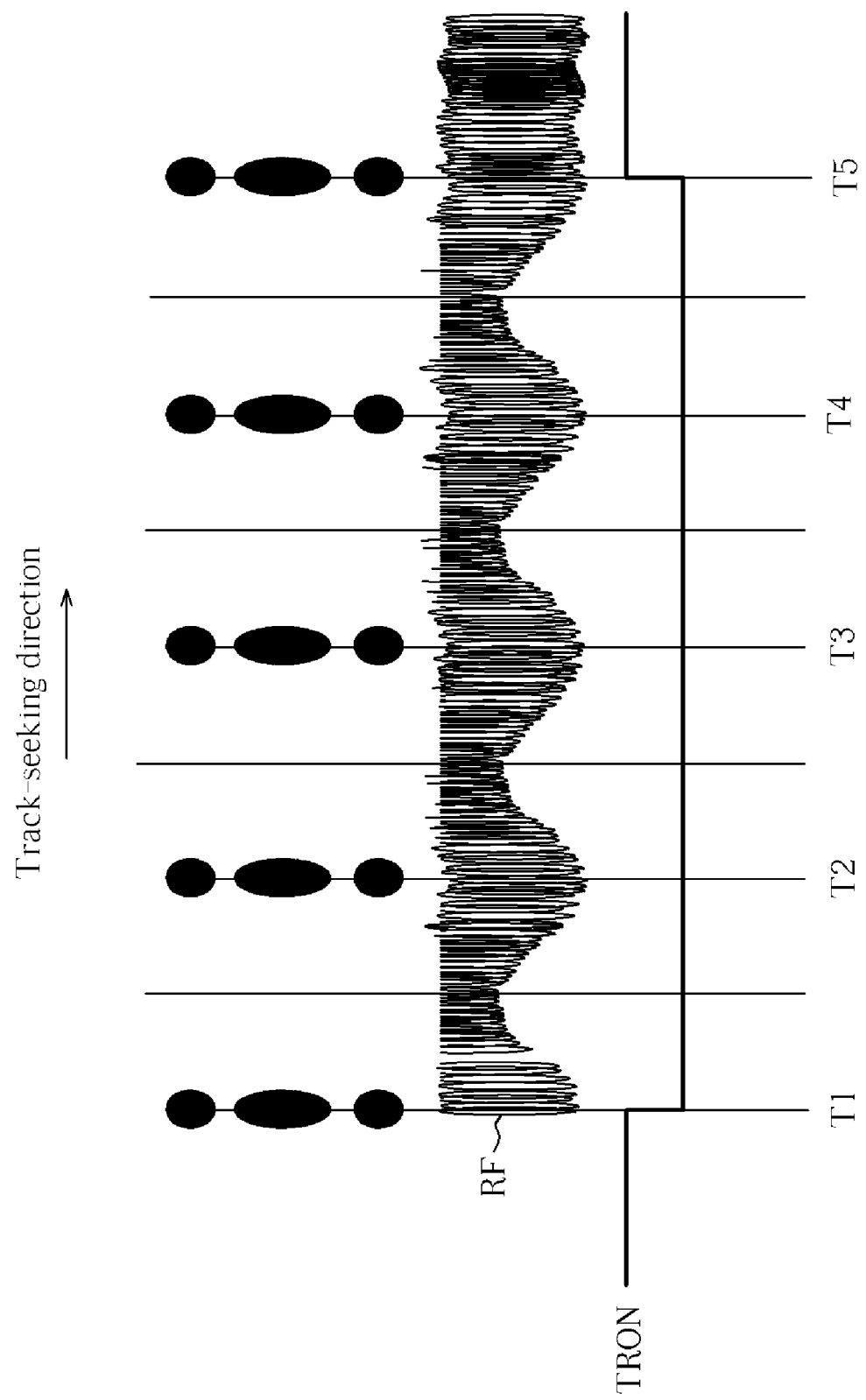
FIG. 2 is a diagram illustrating related signals when the data PLL in FIG. 1 is accessing data.
Figure 3:
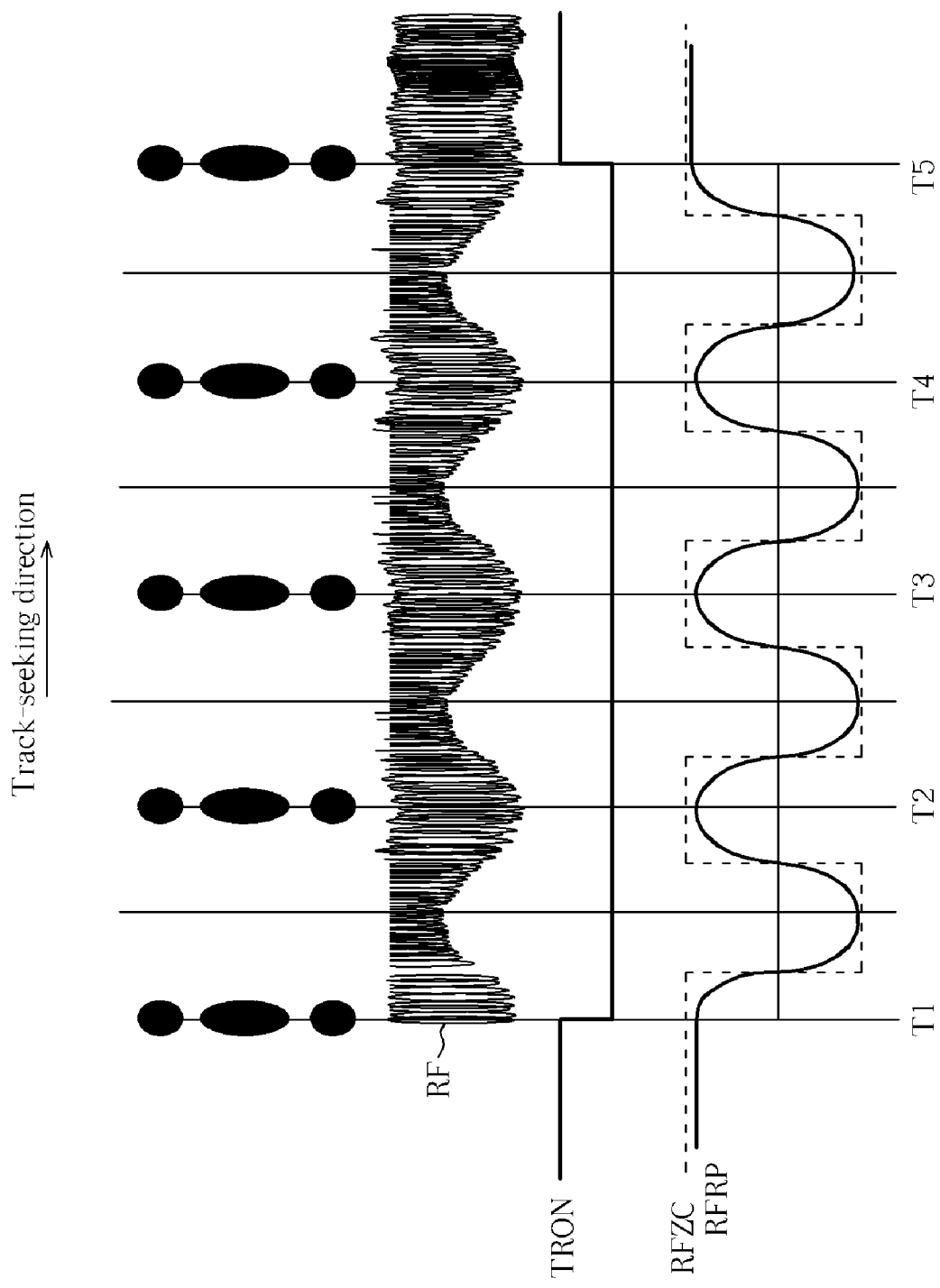
FIG. 3 is a diagram illustrating related signals when an optical device of the present invention is accessing data.

Please refer to FIG. 3 for a diagram illustrating related signals when an optical device of the present invention is accessing data. In FIG. 3, T1-T5 represent data tracks of a storage medium, wherein T1 represents a starting data track, T5 represents a target data track, T2-T4 represent data tracks passed by the pick-up when the optical device performs track-seeking (moving from the data track T1 to the data track T5), RF represents a radio frequency signal of the optical device, TRON represents a track-seeking signal of the optical device, RFRP represents a radio frequency ripple signal (RFRP signal) of the optical device, and an arrow indicates the track-seeking direction of the optical device.

In FIG. 3, the track-seeking signal TRON having a low potential indicates that the optical device is performing track-seeking on the storage medium and is not required to access data, while the track-seeking signal TRON having a high potential indicates that the optical device has finished track-seeking and is ready for data access. The RFRP signal is generated by exercising bottom-hold and inversion on the RF signal of the optical device. The RFRP signal is represented by a sine wave having different potentials when the pick-up of the optical device is performing track-seeking, and has a flat potential when the pick-up of the optical device is on-track, which means the pick-up of the optical device has already completed track-seeking and has found the target track. Based on the potentials of the RFRP, the corresponding RFZC signal can be generated. The RFZC signal of pulse waves having high and low potentials indicate whether the pick-up of the optical device passes through a data track of the storage medium during track-seeking. As shown in FIG. 3, when the track-seeking signal TRON has a low potential and the RFZC signal has a high potential, the pick-up of the optical device is performing track-seeking and is passing through a data track of the storage medium; when the track-seeking signal TRON has a low potential and the RFZC signal has a low potential, the pick-up of the optical device is performing track-seeking but is not passing through a data track of the storage medium.

Figure 4:
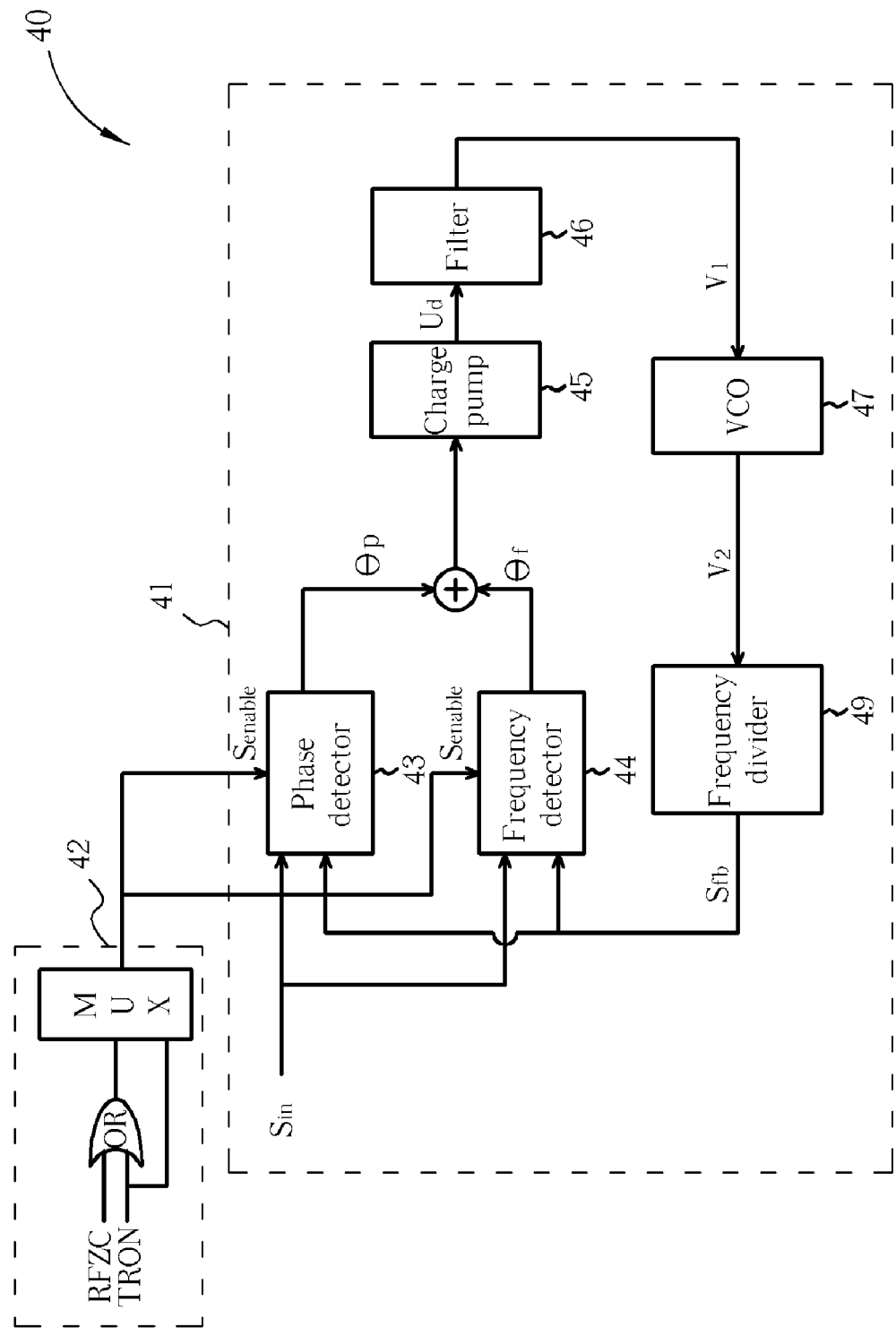
FIG. 4 is a diagram of a data PLL used in an optical device according to the present invention.

Please refer to FIG. 4 for a data PLL used in an optical device 40 according to the present invention. The optical device 40 includes a data PLL 41 and a control circuit 42. The data PLL 41 includes a phase detector 43, a frequency detector 44, a charge pump 45, a filter 46, a voltage-controlled oscillator (VCO) 47, and a frequency divider 49. When the optical device 40 (such as a CD player) performs track-seeking on a storage medium (such as a CD), the frequency range of the measured signals (such as eight-to-fourteen modulation signals) can greatly vary due to the storage medium (for example as a result of different rotational speeds of the inner and outer data tracks of the CD). In the optical device 40 of the present invention, it is determined whether a pick-up of the optical device 40 is performing track-seeking and is passing through a data track of the storage medium based on the TRON and the RFZC signals shown in FIG. 3. When the TRON signal has a low potential and the RFZC signal has a high potential, the control circuit 42 of the optical device generates a trigger signal $S_{enable}$, which is then sent to the phase detector 43 and the frequency detector 44 for activating the data PLL 41. The data PLL 41 performs phase and frequency adjustments according to signals measured from the data track by which the pick-up of the optical device 40 is passing at this point. The control circuit 42 can include an OR gate and a multiplexer MUX, which generate the trigger signal $S_{enable}$ based on the RFZC and the TRON signals.

In one embodiment of the present invention, after receiving the trigger signal $S_{enable}$, the data PLL 41 first activates the frequency detector 44 so that the frequency of a clock rate signal roughly matches that of an input signal $S_{in}$. Then the data PLL 41 activates the phase detector 43 so that the frequency and the phase of the clock rate signal precisely latch those of the input signal $S_{in}$. In other embodiments, the frequency and the phase of the clock rate signal can be adjusted only by the phase detector 43. Therefore, the data PLL 41 receives the input signal $S_{in}$ measured while the optical device 40 is performing track-seeking on the storage medium. Based on the phase and frequency differences between the input signal $S_{in}$ and a feedback signal $S_{fb}$, the phase detector 43 and the frequency detector 44 generates a phase-adjusting signal θp and a frequency-adjusting signal θf, respectively. Next, the phase-adjusting signal θp and the frequency adjusting signal θf are sent to the charge pump 45, which generates a corresponding current signal Ud based on received signals. The filter 46 can be a loop filter or a low-pass filter which can generate a voltage signal V1 based on the received current signal Ud. Subsequently, the VCO 47 generates a periodic pulse signal V2 based on the voltage signal V1, the frequency-divider 49 generates the feedback signal $S_{fb}$ by dividing the frequency of the periodic pulse signal V2, then the feedback signal $S_{fb}$ is sent to the phase detector 43 and the frequency detector 44, thereby forming a feedback loop until the phase and the frequency of the feedback signal $S_{fb}$ match those of the input signal $S_{in}$.

Since the data tracks T1 and T5 have different rotational speeds, the frequency range measured by the optical device 40 also varies, and the frequency range difference between two data tracks depends on the radial distance between these data tracks. In the embodiment shown in FIG. 3, the data PLL 41 are activated 3 times during the track-seeking process during which the pick-up of the optical device is moved from the data track T1 to the data track T5. Thus, the data PLL 41 performs phase and frequency adjustments on signals measured from the data tracks T2, T3 and T4. As a result, after finishing track-seeking, the optical device 40 only needs to adjust the small phase and frequency differences between signals measured from the data tracks T4 and T5, instead of adjusting the large phase and frequency differences between signals measured from the data tracks T1 and T5. Therefore, the adjustment time after track-seeking is greatly reduced and the data access time of the optical device 40 is largely improved.

In the prior art optical device, the data PLL starts phase and frequency adjustments only after the pick-up of the optical device has finished track-seeking and found the target data track. Since signals measured from the starting data track and the target data track vary a lot, it often takes a long time to complete the necessary adjustments. Therefore, the prior art optical device has long data access time. Compared to the prior art, in the present invention it is determined whether the pick-up of the optical device passes through a data track of the storage medium during track-seeking based on the RF signal, the RFZC signal, and the TRON signal of the optical device. When the pick-up of the optical device passes through the data track of the storage medium during track-seeking, a trigger signal is sent to the data PLL of the optical device for performing phase and frequency adjustments. Therefore, the present invention can reduce the time required for phase and frequency adjusts after track-seeking and speed up the data access time.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A data phase locked loop capable of being activated during track-seeking comprising:
    a phase detector for generating a phase-adjusting signal based on an input signal and a feedback signal of an optical device;
    a frequency detector for generating a frequency-adjusting signal based on the input signal of the optical device and the feedback signal;
    an adjusting circuit for generating the feedback signal based on the phase-adjusting signal and the frequency-adjusting signal; and
    a control circuit for generating and sending a trigger signal to the phase detector and the frequency detector for activating the phase detector and the frequency detector when a pick-up of the optical device is performing track-seeking on a storage medium and is on a data track of the storage medium according to a radio frequency zero cross signal (RFZC signal), the control circuit comprising:
        an OR gate electrically connected to the optical device for generating an output signal based on the RFZC signal and a track-seeking signal of the optical device; and
        a multiplexer electrically connected to the optical device and the OR gate for generating the trigger signal based on the track-seeking signal or the output signal of the OR gate.

2. The data phase locked loop of claim 1 wherein the adjusting circuit comprises:
    a charge pump electrically connected to the phase detector and the frequency detector for generating a current signal based on the phase-adjusting signal and the frequency-adjusting signal;
    a filter electrically connected to the charge pump for generating a voltage signal based on the current signal;
    a voltage control oscillator (VCO) electrically connected to the filter for generating a periodic pulse signal based on the voltage signal; and
    a frequency divider electrically connected to the voltage control oscillator for generating the feedback signal based on the periodic pulse signal.

3. The data phase locked loop of claim 1 wherein the storage medium includes a compact disk (CD).

4. The data phase locked loop of claim 1 wherein the storage medium includes a digital versatile disc (DVD).

5. The data phase locked loop of claim 1 wherein the storage medium includes a video compact disc (VCD).

6. The data phase locked loop of claim 1 wherein the input signal of the optical device is a modulated signal read by the optical device.

* * * * *